April 30, 1968 J. A. HACKETT ET AL 3,381,094

DIAL PULSE INCOMING TRUNK HAVING A SELF-CONTAINED PULSE COUNTER

Filed Oct. 8, 1964 6 Sheets-Sheet 1

INVENTORS
J. A. HACKETT
C. A. SEPULVEDA
BY Donald M. Duft
ATTORNEY

DIAL PULSE INCOMING TRUNK HAVING A SELF-CONTAINED PULSE COUNTER

Filed Oct. 8, 1964 6 Sheets-Sheet 2

April 30, 1968 J. A. HACKETT ET AL 3,381,094

DIAL PULSE INCOMING TRUNK HAVING A SELF-CONTAINED PULSE COUNTER

Filed Oct. 8, 1964 6 Sheets-Sheet 4

April 30, 1968 J. A. HACKETT ET AL 3,381,094

DIAL PULSE INCOMING TRUNK HAVING A SELF-CONTAINED PULSE COUNTER

Filed Oct. 8, 1964 6 Sheets-Sheet 6

United States Patent Office 3,381,094

Patented Apr. 30, 1968

3,381,094

DIAL PULSE INCOMING TRUNK HAVING A SELF-CONTAINED PULSE COUNTER

John A. Hackett, Matawan, and Carlos A. Sepulveda, Jackson, N.J., assignors to Bell Telephone Laboratories, Incorporated, New York, N.Y., a corporation of New York Filed Oct. 8, 1964, Ser. No. 402,532
30 Claims. (Cl. 179—18)

ABSTRACT OF THE DISCLOSURE

A switching system is disclosed wherein a plurality of incoming dial pulse trunks, each capable of counting and registering the initial two pulses of the first digit of a call, permit a toll office to receive dial pulses immediately upon seizure of an incoming trunk, without the necessity of waiting for an idle dial pulse receiver to be connected. When connected, the receiver counts any additional pulses (beyond two) of the first digit, updates its count by the number of pulses registered in the trunk, and counts all pulses of subsequent digits after the trunk circuit counter has been disabled.

Figures 1, 7:
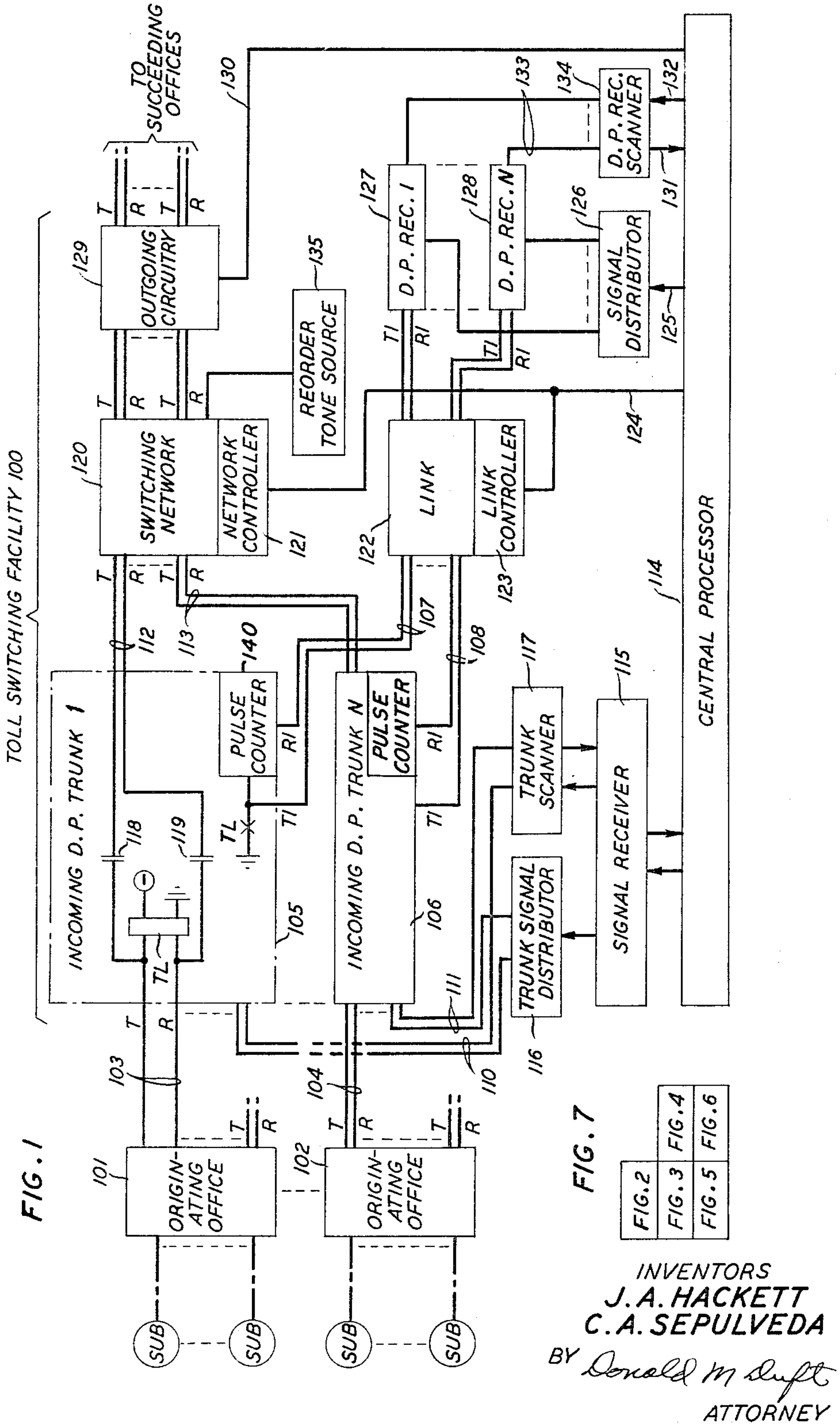

This invention relates to a switching system in which a calling incoming trunk circuit is temporarily connected to equipment which counts and registers the dial pulses received by that trunk circuit during the serving of a call. This invention further relates to a telephone switching system in which the need for fast-acting bylinks between incoming dial pulse trunk circuits and pulse registration equipment is eliminated by equipping each trunk circuit with a counter which counts and registers the pulses received, during the serving of a call, prior to the time a link connection is established to the pulse registration equipment.

The control of switching equipment by pulses generated at the dial of a calling subset requires that pulse responsive equipment be attached to the calling circuit prior to the time the dialing operation begins in order that all pulses generated by the dial will be effective in controlling the establishment of the desired connection. This requirement presents no problem in either local or toll step-by-step offices since the dial pulse responsive equipment comprises an inherent portion of each switching stage. This requirement also presents no problems in local offices of the common control type since, in these, the subscriber dialing operation is effectively delayed by withholding the application of dial tone until it has first been determined that the necessary dial pulse registration equipment has been attached to the calling circuit.

The requirement that pulse responsive equipment be attached to a calling circuit prior to the generation of dial pulses presents its greatest problems when subscribers served by local step-by-step offices are permitted access, for direct distance dialing purposes, to toll offices of the common control type. Step-by-step subscribers often initiate such calls by first dialing a directing code, comprising one or more digits, in order to obtain access to the toll office. Following this, they then dial the customary seven or ten digits required by the toll office for the serving of the call. In order to ensure that the necessary pulse registration equipment is attached to the calling connection at the toll office prior to the reception of the first dial pulse thereat, it has been common practice to use fast-acting bylinks to interconnect the incoming toll trunk with suitable pulse registration equipment or, alternatively, to apply a dial tone to the connection at the toll office only after the required pulse registration facilities are attached.

Neither expedient is ideal. The use of bylinks is disadvantageous since these links are far more expensive than links of conventional speed. Further, even when bylinks are utilized, instances still occur in which digits are lost due to rapid dialing by a subscriber.

The use of dial tone at the toll office is disadvantageous since it precludes the adoption of toll dialing practices that are of nationwide uniformity. The application of dial tone by the toll office (the second dial tone for the call) is required only for step-by-step customers. It is not required for local offices of the common control type since, in these, the dialed digits are registered and then automatically outpulsed to the toll office only after the reception of a signal indicating that the pulse registration facilities are attached to the incoming circuit at the toll office. Thus, the utilization of the dial tone at the toll office is unique to step-by-step customers and is undesirable since toll calls may sometimes be initiated from step-by-step offices by subscribers, who, not being aware of the required dialing practices of that local office, may not wait for the second dial tone before dialing into the toll office. This, in turn, will cause some of the dialed digits to be lost and will preclude the successful completion of the call.

It may be seen from the foregoing that a need exists for the provision, at a toll switching office, of facilities which are inexpensive, which permit the utilization of uniform dialing practices, and which permit incoming trunks to receive dial pulses immediately upon their seizure by an originating step-by-step office.

It is therefore an object of this invention to provide improved dial pulse registration facilities at a toll office.

It is a further object of this invention to provide equipment which permits the reception of dial pulses immediately upon seizure of an incoming trunk at a toll office.

In accordance with the foregoing, a toll office is disclosed having a plurality of incoming dial pulse trunk circuits, a plurality of dial pulse receivers, and a link for interconnecting a calling trunk circuit with an idle receiver. Each trunk circuit includes a self-contained two-pulse counter which counts the initial two pulses of the first digit received on a call. The dial pulse receivers count and register any additional pulses comprising the first digit, as well as all pulses of all subsequent digits.

An incoming dial pulse trunk circuit, as soon as it is seized, activates its counter in preparation for the reception of the first two pulses and, at the same time, initiates a bid for a connection to an idle dial pulse receiver. The line relay in the trunk follows the received dial pulses. Contacts of the line relay control the trunk counter and cause it to count and register the initial two pulses. In the meantime, the control circuitry of the office recognizes the trunk's request for a connection to a dial pulse receiver and, in response thereto, proceeds to establish a link connection between the calling trunk and an idle receiver. The equipment provided in the office is sufficiently fast in its operation so that a connection is normally established to a receiver prior to the time the third pulse is received.

The receiver takes no action after its connection on a call until it first receives a signal indicating that the two pulses have been received and counted by the trunk. The receiver then counts all additional pulses of the first digit. It up-dates its registration by a count of two after the first digit is received in order to compensate for the two pulses counted by the trunk. The trunk counter is then disabled and, from then on, all pulses of all the remaining digits are counted and registered by the dial pulse receiver.

The receiver performs no counting operation for the first digit if the digit is a 1 or a 2. In this case, the receiver receives information from the trunk indicating whether one or two pulses were received. This information is then used by the receiver to provide an output indication signifying the value of the digit.

The foregoing arrangement is advantageous since it enables the toll office to receive dial pulses immediately upon the seizure of an incoming trunk. At the same time, it eliminates the need for the expensive bylinks used heretofore and, instead, permits a relatively inexpensive link of conventional speed to be used as the interconnecting medium between the dial pulse trunks and the dial pulse receivers.

A feature of this invention is the provision of equipment in an incoming trunk circuit for counting and registering received dial pulses.

A further feature of this invention is the provision of equipment in an incoming trunk circuit for counting and registering a predetermined maximum number of pulses during the reception of the first digit pulse train on a call.

A further feature of this invention is the provision of equipment in a trunk circuit for counting and registering the initial two pulses reecived during the serving of a call.

A further feature of this invention is the provision of equipment in an incoming trunk circuit for counting and registering the initial two pulses of the received pulse train representing the first digit of a call, together with the provision of a dial pulse receiver for counting and registering any remaining pulses in said first digit pulse train.

A further feature of this invention is the provision in a switching system of a counter in an incoming trunk circuit for counting and registering the initial two pulses of a first received digit together with the provision of a dial pulse receiver for counting and registering, under control of said trunk, any remaining pulses representing the first digit, as well as for counting and registering all pulses of any subsequently received digits for the same call.

A further feature of this invention is the provision of a counter in a trunk for counting and registering the initial two digits, or less, of the first digit received on a call together with the provision of a dial pulse receiver for counting and registering any subsequent pulses representing the first digit, with the trunk counter having facilities for indicating to the receiver the number of pulses received when the first digit is a 1 or a 2, as well as for indicating to the dial pulse receiver that no digits have been received.

A further feature of this invention is the provision in a switching system of a counter in an incoming trunk, a link for connecting a dial pulse receiver to the trunk subsequent to its seizure, equipment in the trunk for registering the initial two pulses of the first digit together with facilities for transmitting an indication from the trunk to the receiver that the two pulses have been received, with facilities for transmitting an indication from the trunk count the remainder of the pulses in the first digit; the receiver then being effective to up-date the numerical value of its first digit registration by a count of two in order to provide a final registration representing the true value of the first digit.

A further feature of this invention is the provision in a switching system of an incoming trunk having a self-contained counter for counting and registering a maximum of *n* pulses of the first digit pulse train on a call where *n* may be less than, equal to, or more than the number of pulses representing said first digit, with said switching system also having a dial pulse receiver which is interconnectible with the trunk on each call to register the digits in excess of *n* of said first digit, as well as for registering all pulses of subsequently received digits.

These and other objects and features of this invention may be made readily understood when taken in conjunction with the following description and drawing, in which FIG. 1 diagrammatically discloses the various elements comprising the present invention; while FIGS. 2 through 6, when arranged as shown in FIG. 7, together disclose the details of an exemplary embodiment of the invention.

GENERAL DESCRIPTION

The block diagram of FIG. 1 discloses a toll switching facility 100 which serves a plurality of local offices on an originating basis, for example, offices 101 and 102. Each local office is connected to a plurality of incoming DP trunk circuits at the toll facility. Local office 101 is shown connected over trunk pair 103 to incoming trunk circuit 105, while office 102 is shown connected over trunk pair 104 to trunk circuit 106. The incoming trunk circuits 105 through 106 are of the dial pulse type and thus receive call information outpulsed in dial pulse form from the local offices and representing the connection that is to be established by the toll switching facility. The pulses received from local offices 101 and 102 may be generated by the calling subscriber's dial, or they may be generated by automatically controlled local office outpulsing apparatus.

The incoming trunk circuits 105 through 106 are connected on their outgoing sides to the switching network 120 by means of tip and ring pairs 112 through 113 and are also connected to the incoming side of link 122 by means of the tip and ring pairs 107 through 108. The switching network 120 is effective on each call to interconnect the calling trunk to the outgoing circuitry 129 extending to the succeeding office. The link 122 is effective on each call to interconnect the calling trunk with a dial pulse receiver in order that the digital information outpulsed from the originating office may be registered for use in controlling the establishment of a connection through the toll switching facility.

The present invention is disclosed as comprising a portion of an electronic switching system of the type disclosed in detail in the application to Doblmaier et al., Ser. No. 334,875, filed Dec. 31, 1963. The Doblmaier et al. system is also described in the entirety of the Bell System Technical Journal of September 1964. As disclosed in detail in said Doblmaier application, electronic offices of this type are controlled by a central processor 114 which, in combination with signal distributor 126, dial pulse receiver scanner 134, trunk signal distributor 116, trunk scanner 117, and signal receiver 115, monitors the status of all circuits within the office, recognizes service requests and changes of state of certain circuits, receives the call digits outpulsed from originating offices, and, in response thereto, transmits commands to various circuits in order that they may operate to perform the call service required by the calling trunk. The central processor monitors the current condition of each incoming trunk circuit by means of trunk scanner 117 and signal receiver 115. Certain of the relays in the incoming trunks are operated and released in response to commands issued by the central processor to the signal receiver 115 and, in turn, to the trunk signal distributor 116. The trunk signal distributor responds to each command and applies either an operate or a release pulse to a trunk relay, depending upon the nature of the command.

Similarly, the central processor monitors the current condition of the dial pulse receivers by means of dial pulse receiver scanner 134 and controls the operation of the various relays therein by means of signal distributor 126. The outgoing circuitry 129, which represents the outgoing portion of the office, is controlled by the central processor over cable 130. This circuitry may include the necessary scanning and signal distribution equipment in order that it may be controlled by the central processor in the same manner shown for the trunks and the dial pulse receivers.

A call is initiated in the conventional manner when a subscriber served by a local office, office 101 for example, removes the receiver of his subset from its switchhook and dials the directing digits required to establish a connection to an incoming trunk circuit, such as 105, at the toll facility. The TL relay in trunk circuit 105 operates from the loop current in the conventional manner once it is seized by the originating office. The operation of this relay effects the necessary circuit operations to inform the central processor 114 that the trunk circuit has received a call and also prepares its pulse counter for the counting and registration of the first two pulses received from the originating office.

The central processor 114, once it is notified that trunk circuit 105 has received a call, determines, by means of dial pulse receiver scanner 134, which of the dial pulse receivers 127 through 128 are idle, and if an idle one is found, signals link controller 123 to establish a connection, via link 122, between the tip and ring pair 107 of the calling trunk and the tip and ring pair of the selected dial pulse receiver.

The system of the present invention does not require the calling party to wait for a second dial tone, and therefore dial pulses may be received by the TL relay of trunk circuit 105 immediately subsequent to its seizure by the originating office. The TL relay follows these dial pulses in the conventional manner and, by means of its make contacts, causes the pulse counter within the trunk circuit to count and register the first two pulses. The time required for link 122 to establish a connection between the calling trunk and an idle dial pulse receiver may vary, depending upon the call load within the office. Thus, the connection may either be established before any dial pulses are received, during or after the time the first dial pulse is received, as well as during or after the time the second pulse is received.

The operation of these circuits is sufficiently fast so that, normally, the connection will be established before any dial pulses are received. However, certain delay conditions may be encountered within the office, during which outpulsing from the originating office will begin before a trunk connection to an idle dial pulse receiver is obtained. It is therefore necessary that the calling trunk, once it is attached to the receiver, transmit information to the receiver indicating the current status of the call. This is accomplished by the pulse counter in the trunk which applies signals to its R1 output conductor indicating whether no pulses, one pulse, or more than one pulse has been received and registered. This signal is extended over the R1 conductor, through link 122, to the dial pulse receiver. This information is used by the receiver both to determine the state of the trunk at the time the connection to the receiver is established, and to enable the receiver to follow the progress of the call as the trunk receives additional pulses subsequent to its connection to the receiver.

The make contacts of the TL relay follow the received dial pulses and reapply them both to the trunk pulse counter and to the T1 conductor extending through the link to the connected dial pulse receiver. The first two pulses received are always registered in the trunk counter, regardless of whether or not a connection to an idle receiver is established before outpulsing begins at the originating office. A connected dial pulse receiver, even though it may be receiving pulses on its R1 lead from the trunk, delays the initiation of its counting operation until it first receives a signal on the R1 lead from the trunk, indicating that two pulses have been counted and registered. Once it receives this signal, it then counts and registers any subsequent pulses of the first digit. Assuming that the first digit has a value of 3, or higher, the received pulses in excess of two are counted and registered by the dial pulse receiver. Then, at the termination of the pulse train for the first digit, the receiver up-dates its registration by a count of two in order to provide an indication of the true value of the first digit. The pulse counter in the trunk is disabled after the first digit is received. From then on, the dial pulse receiver counts the pulses representing subsequent digits under control of the pulses applied to its T1 lead from the make contact of the TL relay within the calling trunk.

There may be certain instances in which the first digit is either a 1 or a 2. There may also be instances in which the subscriber fails to dial further, once having obtained a connection to the toll switching facility, and in this case no digits will be received. In all of these instances, the dial pulse receiver performs no counting operation for the first digit and, instead, receives an indication, by means of signals applied to the R1 conductor, signifying whether one pulse, two pulses, or no pulses were counted for the first digit.

If the dial pulse receiver receives an indication at the end of the interdigital time that the first digit is a 1 or a 2, it controls its readout circuitry to provide an output indication of a 1 or a 2 even though no pulses were counted by the receiver. The reception of no pulses by the incoming trunk beyond a predetermined time period represents a trouble condition. This condition is detected by the central processor which causes the calling connection to be routed to a reorder tone.

In connecting a receiver to a bidding trunk, the central processor may occasionally encounter a delay of sufficient duration so that the manner in which the call is served is dependent upon the number of pulses received by the trunk prior to the time the receiver is attached. The receiver is notified of the delay in its attachment, and it serves the call in the usual manner if it is determined that either no pulse, or one pulse, has been received by the trunk. However, if the receiver determines that the trunk has received two pulses, it signals the central processor that the call cannot be served in a normal manner. This action must be taken if two pulses have been received by the trunk. Since the potential applied to the R1 lead does not change after the reception of the second pulse, the circuit has no means of discriminating between the various call conditions occurring after this period; therefore, if a receiver is connected at this time, after a delay in its attachment, the circuit has no means of knowing whether the trunk is currently receiving the second pulse, has finished receiving the second pulse, or has already received more than two pulses. This being the case, the system causes the connection to be routed to a reorder trunk whenever this condition is detected, in order to preclude the registration of a false digit.

The central processor 114, by means of dial pulse receiver scanner 134, continually scans the dial pulse receivers in order to identify, and register within its memory, the digits outpulsed from the preceding office. At the termination of the outpulsing operation, the central processor and the network controller 121 together control the establishment of a connection through the office, via switching network 120, to connect the incoming trunk 105 with the outgoing circuitry 129 extending to the succeeding office. Once this connection is established, the central processor may then control whatever outpulsing operation is required of the outgoing circuitry 129 in order to initiate the establishment of the required connection in the next office.

DETAILED DESCRIPTION

*Functions of provided circuits*

FIGS. 2, 3, 4, 5, and 6, when arranged as shown in FIG. 7, disclose the details of the arrangement shown diagrammatically on FIG. 1. A plurality of incoming trunk circuits are shown, with incoming dial pulse 1 being shown in detail on FIG. 2 and with the remainder, including trunk circuit N on FIG. 3, being represented diagrammatically. The incoming trunks serve a plurality of offices on an originating basis, including offices 201 and 301. Incoming trunk circuit 1 exclusively serves trunk 202 extending to office 201, while incoming dial pulse trunk N on FIG. 3 exclusively serves trunk 302 extending to office 301. Each incoming trunk circuit is connectible by means of the switching network 204 and the outgoing circuitry 227 to outgoing trunks extending to succeeding offices. Each trunk circuit is also connectible over its R1 and T1 conductors and link 314 to any of the dial pulse receivers shown on FIGS. 4, 5, and 6. The circuit details of dial pulse receiver 1 are shown on FIGS. 4, 5, and 6, while the remainder of the dial pulse receivers, including dial pulse receiver N, are shown diagrammatically on FIG. 6.

Each trunk circuit includes a TL relay, which is bridged across the incoming end of the circuit and which, in the conventional manner, (1) operates as a loop, (2) is closed within the originating office to seize the circuit, (3) follows the dial pulses transmitted from the originating office, and (4) releases at the end of the call when the calling subscriber hangs up. Each incoming trunk circuit also includes a TA, a TB, and a TC relay. These three relays are of the magnetic latching type and are operated and released by pulses transmitted thereto from the trunk signal distributor 310, under control of signal receiver 304 and central processor 303. Each trunk circuit also contains a TD, a TE, and a TF relay. These three relays, together with their associated circuitry, comprise a two-pulse counter.

Each trunk circuit is exclusively connected to two ferrods in trunk scanner 319. Information pertaining to the magnetic state of each ferrod is continuously transmitted via signal receiver 304 to the central processor 303 for use in enabling the processor to control the over-all operation of the offices priorly described. A ferrod is a detector particularly useful in scanners and is disclosed in the Baldwin et al. application, Ser. No. 26,758, filed May 4, 1960, now U.S. Patent No. 3,175,042 issued Mar. 23, 1965. Such ferrod scanners are utilized in the above-mentioned Doblmaier et al. application, and one such scanner is disclosed in the Guercio et al. application, Ser. No. 250,416, filed Jan. 9, 1963, now U.S. Patent No. 3,254,157 issued May 31, 1966.

Figure 4:
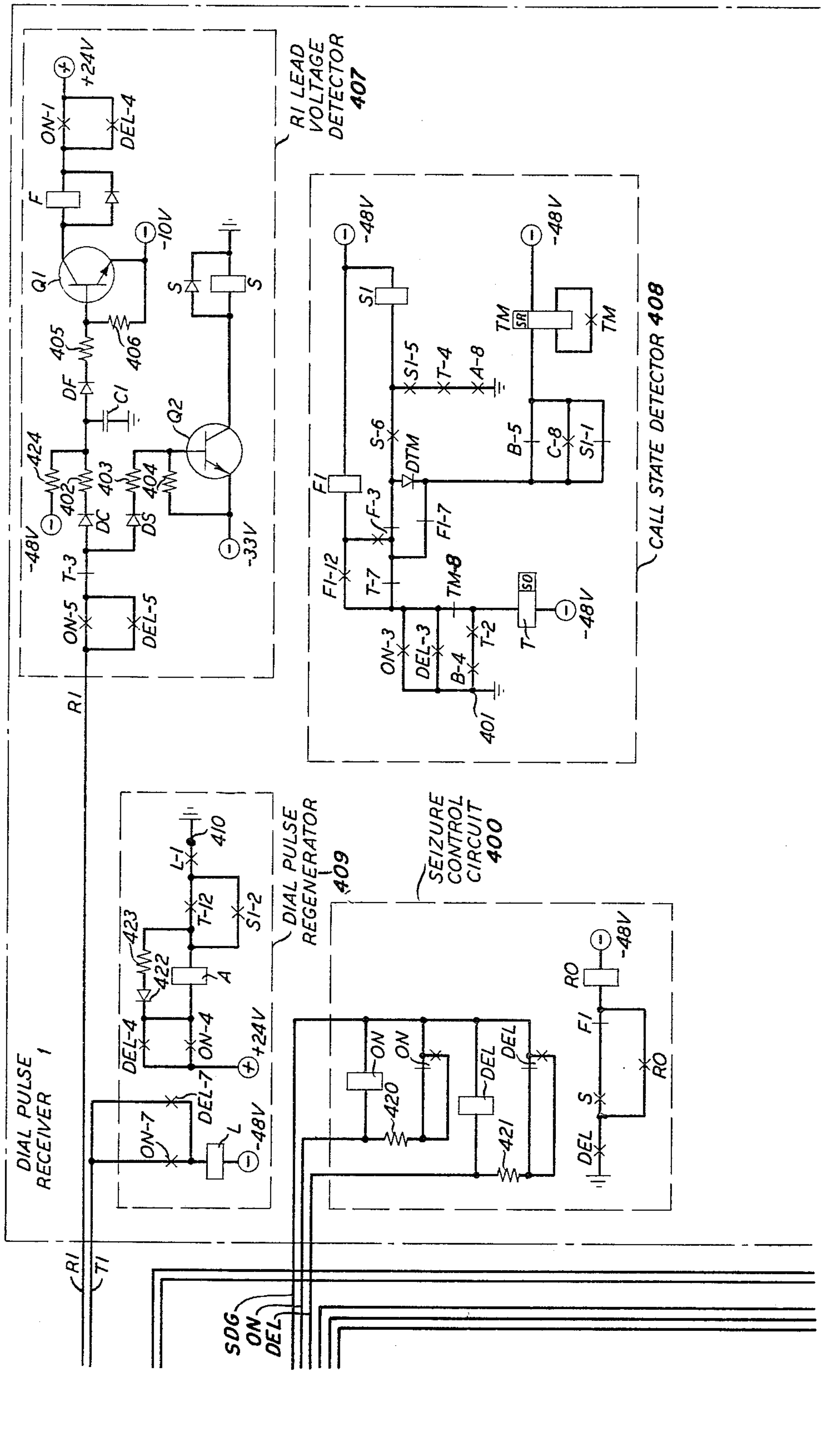
Figure 5:
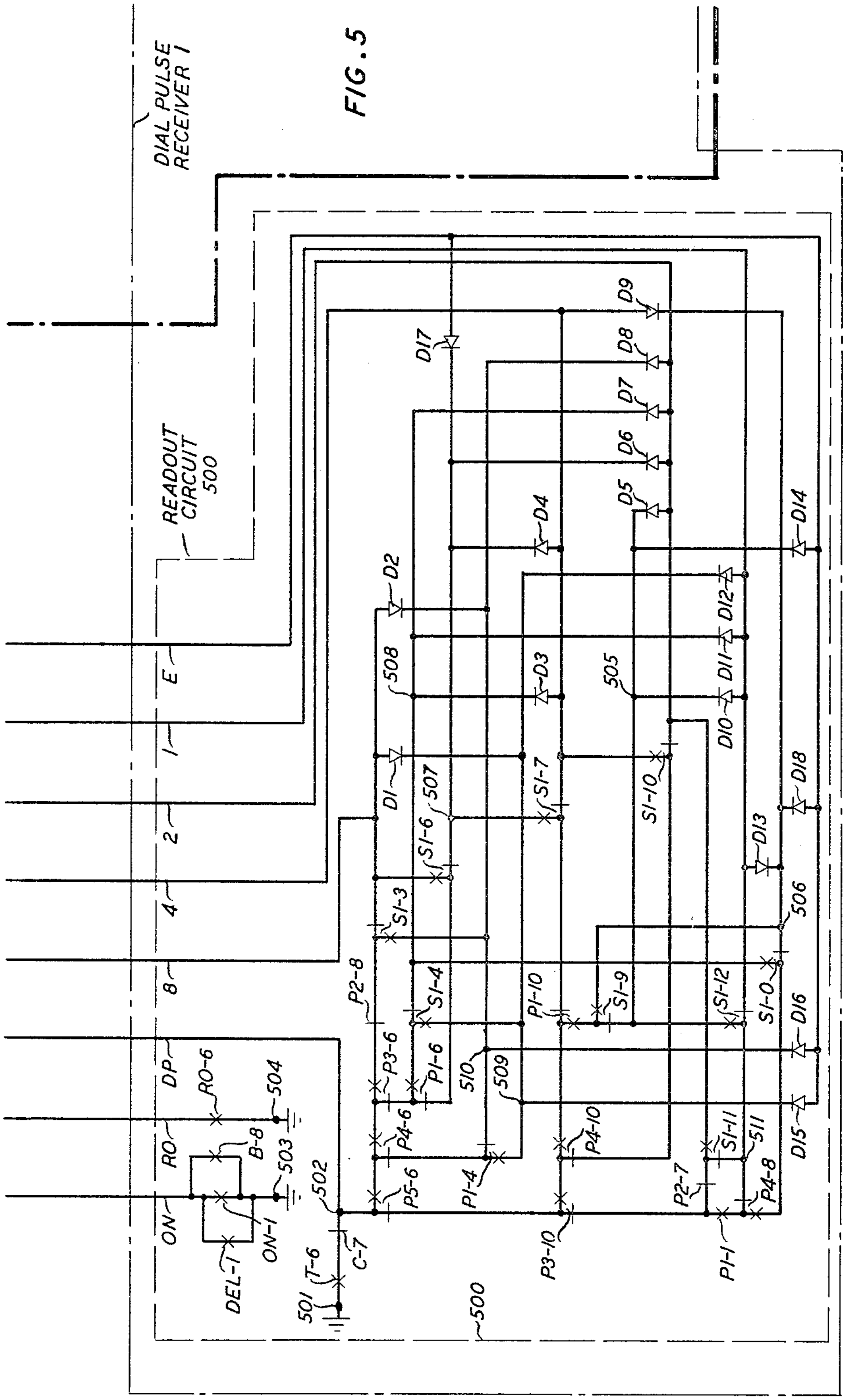
Figure 6:
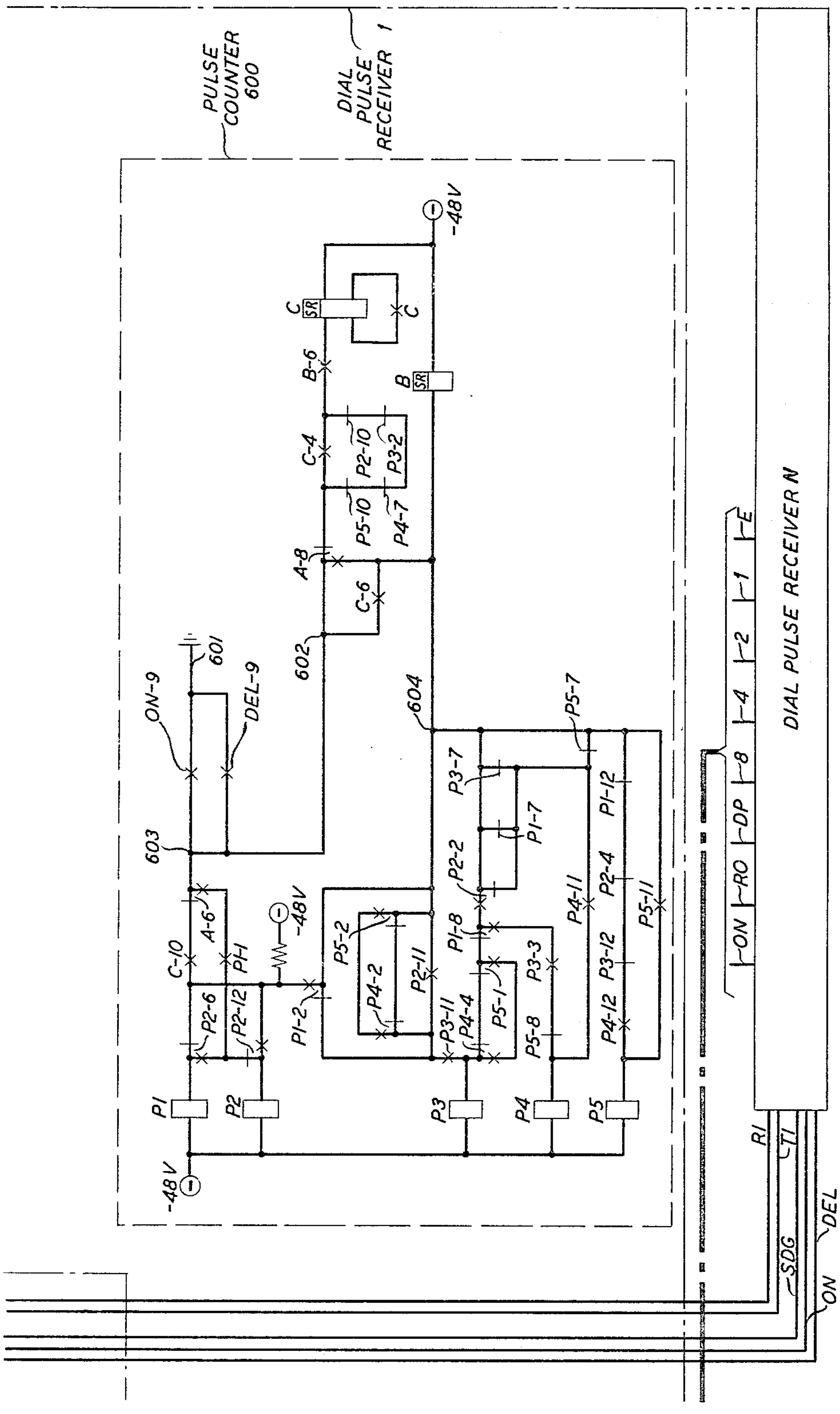

Referring to dial pulse receiver 1, each such receiver comprises control equipment as shown on FIG. 4, a pulse counter as shown on FIG. 6, and a readout circuit as shown on FIG. 5. The control equipment responds to the pulses and other information received from the incoming trunk and, in response thereto, causes the pulse counter circuit of FIG. 6 to count the pulses received from the calling trunk. The readout circuit of FIG. 5 converts the registered information stored in the pulse counter to the proper code form and transmits it to the ferrods in the dial pulse receiver scanner 318. The magnetic state of these ferrods enables the processor 303 to determine the digits received by a calling trunk and registered in the dial pulse receiver.

The control equipment on FIG. 4 comprises a dial pulse regenerator 409, an R1 lead voltage detector 407, a seizure control circuit 400, and a call state detector 408. The seizure control circuit enables the receiver to determine whether it was connected to a calling trunk on the first try by the central processor or, alternatively, whether the processor encountered a sufficient delay in obtaining the services of an idle dial pulse receiver so that the possibility exists that the receiver may not have been connected until two or more pulses had been received by the calling trunk. As is subsequently described in detail, the dial pulse receiver functions differently, depending upon whether it is seized with an indication that no delay was encountered or, alternatively, whether it was seized with an indication that a delay was encountered. The ON and DEL relays within the seizure control circuit are of the magnetic latching type and are operated and released by means of signals received from the signal distributor 305. All other relays in the dial pulse receiver are of the conventional type.

The dial pulse regenerator 409 receives dial pulses from the incoming trunk over its T1 lead and, in turn, regenerates them and applies them to the various circuits within the dial pulse receiver. The R1 lead voltage detector 407 monitors the potentials applied by the trunk to the R1 lead. These potentials are used for determining the progress of the call and the state of the incoming trunk circuit, as subsequently described. The call state detector 408 determines the state of the call currently served by the dial pulse receiver and, in response thereto, controls the operation of other circuits within the dial pulse receiver and, in particular, the pulse counter of FIG. 6. The pulse counter 600 counts and registers, in combinational code form, the number of pulses contained in the pulse train for each received digit, with the exception of the first digit, for which the first two pulses are counted by the trunk counter, with the subsequent pulses, if any, being counted by pulse counter 600. The readout circuit 500 is controlled by the contacts of the pulse counter relays and at the termination of the counting operation for each received digit, the readout circuit translates the information stored in pulse counter 600 into binary form and applies it to the ferrods within the dial pulse receiver scanner 318.

Figure 2:
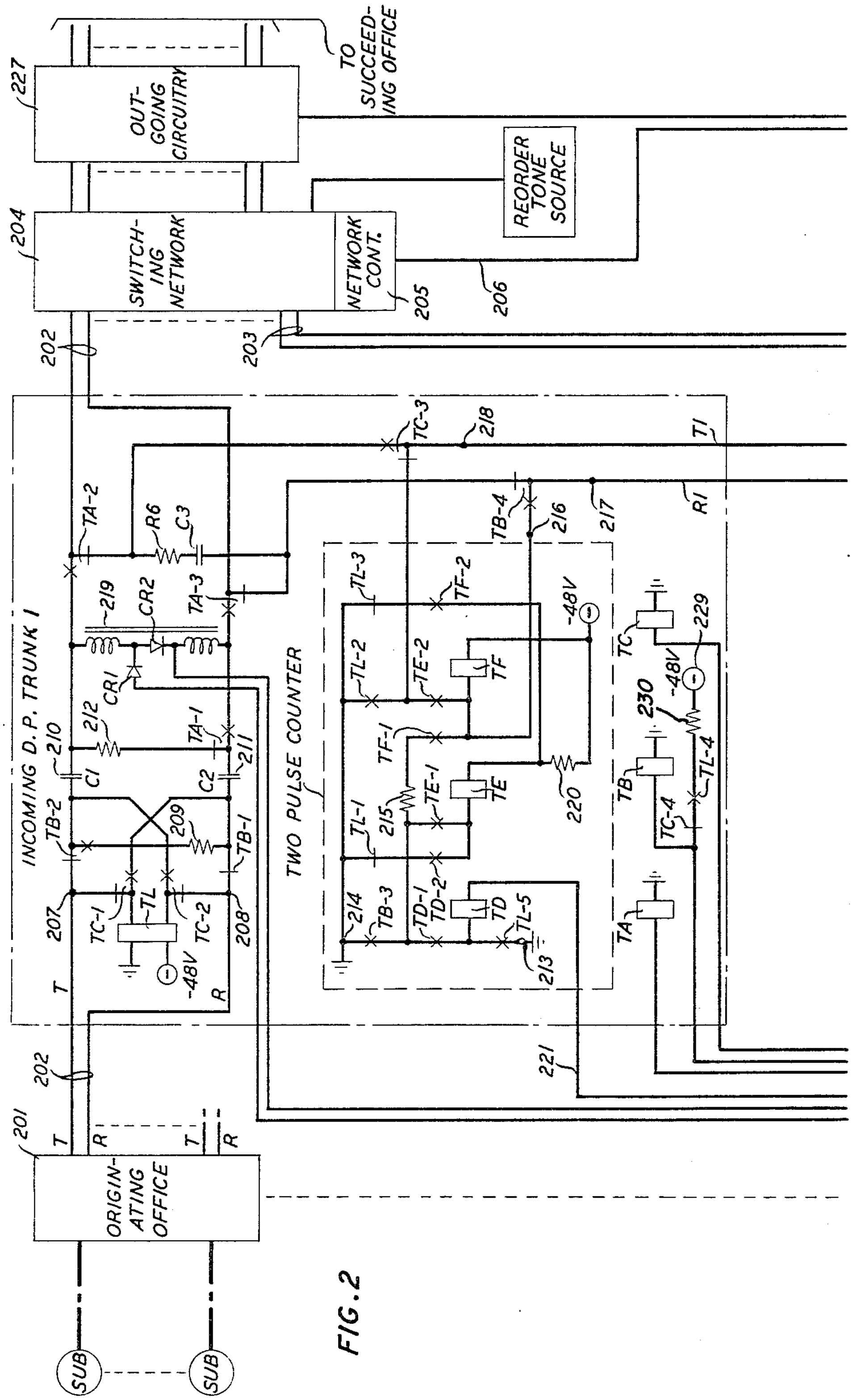
Figure 3:
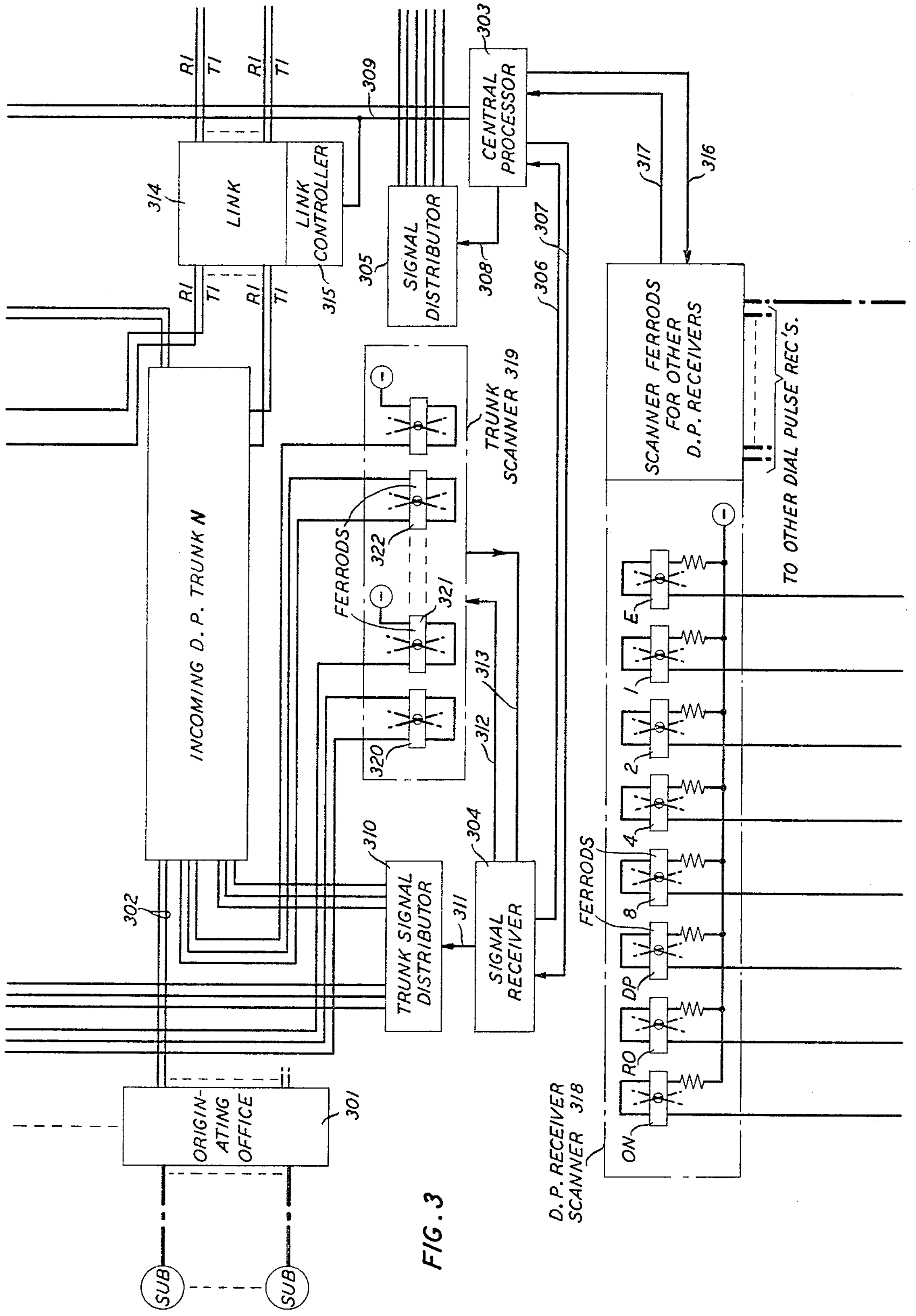

Each relay shown in the embodiment of FIGS. 2 through 6 has an alphabetical designation, and each relay contact bears the alphabetical designation of its controlling relay winding, followed by a numerical designation individual to the contact. For example, the line relay for trunk circuit 1 on FIG. 2 is designed as the TL relay, and its four contacts are designated TL–1, TL–2, TL–3, and TL–4.

Trunk seizure

All relays of trunk circuit are released whenever the circuit is not serving a call. At this time, the trunk presents the proper input impedance termination to the originating office by means of the network comprising capacitor 210, resistor 212, break contacts TA–1, and capacitor 211. This network is connected through break contacts TB–1 and TB–2 to terminals 208 and 207 and, in turn, to incoming trunk 202. The seizure of incoming dial pulse trunk 1 is effected within the originating office as it places a D-C shunt across the tip and ring conductor pair 202 in the conventional manner. This shunt closes an obvious path, which includes break contacts TC–1 and TC–2, to operate relay TL from the resultant loop current supplied by the battery and ground connected to its windings. The operation of relay TL closes the following circuit to operate relay TB: battery on terminal 229, resistor 230, make contacts TL–4, break contacts TC–4, through the winding of relay TB, to ground to operate it. Relays TA, TB, and TC are of the magnetic latching type, which operate upon upon the reception of a negative battery pulse, following which they remain operated until reception of a positive battery pulse, which releases them. These relays are normally operated by the trunk signal distributor 310. However, relay TB is additionally operated at the initiation of a call from the battery supplied by terminal 229, as described.

The operation of relay TL also closes its make contacts TL–5 to complete a path from ground on terminal 213, through the winding of the TD relay, to operate it from the battery supplied to the other side of its winding by means of ferrod 321 over conductor 221. Relay TD, in operating, completes a holding path for itself to ground on terminal 214, through its own make contacts TD–1 and make contacts TB–3. The operation of relay TB, in addition to preparing the aforementioned operate path for relay TD, opens its break contacts TB–1 and TB–2, thereby removing the aforementioned A-C shunt to the incoming trunk provided by capacitor 210, resistor 212 and capacior 211.

The operate current for relay TD flowing through scanner ferrod 321 informs the signal receiver 304 and, in turn, the central processor 303 of the fact that a call has been extended to incoming dial pulse trunk 1 by originating office 201. The central processor responds to the receipt of this signal in the manner priorly described in connection with FIG. 1 and effects the necessary circuit operations to interconnect the T1 and R1 conductors of incoming dial pulse trunk 1 with the corresponding conductors of an idle dial pulse receiver by means of link 314, under control of link controller 315. As subsequently described in detail, let it be assumed that the central processor determines that dial pulse receiver 1 is idle and that it therefore initiates the necessary circuit operations to connect this dial pulse receiver to incoming dial pulse trunk 1 via link 314.

Depending upon the call load within the office, the connection of dial pulse receiver 1 to incoming dial pulse trunk 1 may be completed: (1) before any pulses are received by the trunk circuit, (2) during or after the time the first pulse is received, and (3) during or after the time the second pulse is received. It is convenient at this time, for purposes of description, to assume that the dial pulse receiver is connected to the incoming trunk circuit with a minimum of delay immediately subsequent to the operation of relays TL and TB of the trunk circuit. With this assumption, the receiver is connected to the trunk circuit before any pulses are received.

*Operation of trunk counter*

Relay TL releases as trunk 202 is opened during the transmission of the first pulse from the originating office. The release of relay TL closes the following circuit to operate relay TE: ground on terminal 214, break contacts TL–1, make contacts TD–2, through the winding of the TE relay, through resistor 220 to negative battery. Relay TE, in operating, completes a holding path for itself over its own TE–1 make contacts and make contacts TB–3 to the terminal 214 ground.

Relay TL recloses upon the termination of the first pulse and completes the following path to operate relay TF: ground on terminal 214, make contacts TL–2 and TE–2, and through the winding of the TF relay to negative battery. The operation of relay TF completes a locking path for itself over its TF–1 contacts, through the resistor 215 and through the TB–3 make contacts to the terminal 214 ground.

Relay TL releases upon the reception of the second pulse and completes a path to release relay TE by applying a shunting ground to its right-hand winding terminal. The left-hand winding terminal of the TE relay is connected over its make contacts TE–1 and make contacts TB–3 to the terminal 214 ground. Prior to the second release of the TL relay, relay TE is held up by the battery supplied to its right-hand winding terminal through resistor 220. Then, upon the release of relay TL for the second pulse, the terminal 214 ground is extended over break contacts TL–3 and make contacts TF–2 to the right-hand winding terminal of the TE relay to shunt out the battery supplied thereto by resistor 220, thereby causing the relay to release. Upon the release of the TE relay, the TF relay remains operated over the holding path comprising its make contacts TF–1, resistor 215, make contacts TB–3, to ground on terminal 214.

An examination of the potential applied to terminal 216 during each stage of the counting operation reveals that the nature of the potential on the terminal at any instant of time may be taken as an indication of the current status of the counter circuit. Thus, terminal 216 is held at approximately a negative 48-volt potential through the winding of the TF relay immediately upon the seizure of the trunk, at which time relays TL and TD are operated while relays TE and TF remain unoperated. Terminal 216 remains at the negative 48-volt potential upon the reception of the first pulse, at which time relay TL is released while relays TD and TE are operated. Subsequently, upon the first reclosure of the trunk following the reception of the first pulse, relays TL, TD, TE, and TF are operated. At this time, terminal 216 is grounded through the make contacts TE–2 and TL–2 to the terminal 214 ground. Relays TL and TE release upon the reception of the second pulse, and at this time, due to a voltage divider action, terminal 216 is held at —24 volts. This voltage divider comprises the negative 48-volt battery on the right-hand terminal of relay TF, the winding of relay TF, make contacts TF–1, resistor 215, make contacts TB–3, and the terminal 214 ground. The subsequent reclosure of relay TL, upon the termination of the second pulse, has no effect on either the two-pulse counter circuit or the potential on terminal 216, and therefore terminal 216 is held at —24 volts for the remainder of the time the trunk serves this call.

Thus, in summary of the foregoing, it may be seen that a —48-volt potential on terminal 216 indicates that either no pulses have been received by the trunk or that the trunk is currently in the process of receiving the first pulse; a ground on the terminal indicates that one pulse has already been received, while —24 volts on the terminal indicates that the trunk is either in the process of receiving the second pulse or that it has already received the second pulse.

The potential on terminal 216 is supplied through make contacts TB–4 to terminal 217, and from there, over conductor R1, through link 314, to the corresponding R1 input conductor of dial pulse receiver 1. The pulses generated by make contacts TL–2, as relay TL follows the received pulse train, are applied over break contacts TC–3 to terminal 218. From there, the pulse train is extended over the T1 conductor of the trunk circuit, through link 314, to the T1 conductor of dial pulse receiver 1. The potentials transmitted from the trunk to the receiver over the T1 and R1 conductors together enable the receiver to: first, determine the instantaneous condition of the trunk circuit at the time the receiver is connected thereto, and, secondly, enable the receiver to count and register any pulses in excess of two that are received by the trunk for the first digit. Following the reception of the first digit, the receiver is controlled solely by means of the pulse train transmitted from the trunk to the receiver over the T1 conductor. This pulse train enables the receiver to count all pulses of any subsequently received digits. The potential on the R1 conductor is of no effect on the receiver following the reception of the first digit. Therefore, following the reception of the first digit, the pulses applied to terminal 218 and T1 conductor enable a dial pulse receiver to count all pulses of any subsequently received digits.

*Connection of dial pulse receiver*

The central processor 303, once it was advised by the energization of scanner ferrod 321 regarding the presence of a call on incoming dial pulse trunk 1, scanned its list of dial pulse receivers in order to find an idle receiver currently available for the serving of this call. Once such a receiver was found, the central processor instructed signal distributor 305 to seize the receiver which the processor has selected. The central processor simultaneously instructed link 314, via link controller 315, to interconnect incoming dial pulse trunk 1 with the selected receiver. Let it be assumed that dial pulse receiver 1 was selected for use on this call. This being the case, the central processor instructed the signal distributor 305 to seize this particular receiver; and the signal distributor, upon receipt of this information, seized dial pulse receiver 1 by applying a ground to its SDG lead and a negative pulse to its ON lead extending to the seizure control circuit 400. The ground on the SDG lead and the negative pulse on the ON lead operated the magnetic latching relay ON and, once operated, it remains operated for the duration of the dial pulse receiver usage on this call. The operation of the ON relay closed the following circuit to operate relay TM in the call state detector on the same figure: ground on terminal 401, make contacts ON–3, break contacts T–7, F1–7, B–5, through the upper winding of relay TM to negative 48-volt battery.

The operation of the ON relay also closed its make contacts ON–5 to connect the R1 lead from link 314 to the R1 lead voltage detector 407. It has already been mentioned how at this time the R1 lead may have varying potentials thereon, depending upon whether no pulse, one pulse, or two or more pulses have been received. The R1 lead voltage detector now analyzes the potential on the R1 lead and informs the receiver regarding the current state of the incoming trunk circuit.

A calling trunk and a dial pulse receiver will often be interconnected before any dial pulses have been received. In such instances, a negative 48-volt potential is applied by the trunk to the R1 lead at this time. This negative 48-volt potential is extended through make contacts ON–5, break contacts T–3, the DC diode, resistor 402, diode DF, resistor 405, to the base of transistor Q1. The presence of the negative 48-volt potential on the base of this transistor maintains its base emitter junction in a back-biased state since the emitter of the transistor is held at a negative 10 volts. This holds the transistor off and relay F remains unoperated. The same negative 48-volt potential is applied through diode DS and resistor 403 to the base of transistor Q2. The emitter of this transistor is at —33 volts, and therefore the transistor remains off and relay S does not operate. No further circuit actions occur within the dial pulse receiver until the first pulse is received by the incoming trunk circuit.

A ground is placed on the R1 conductor by the trunk immediately following its reception of the first pulse. This ground is extended through make contacts ON–5 and the remainder of the circuitry priorly described, to the base of transistor Q1 as well as to the base of transistor Q2. Both transistors turn on at this time. The turn-on of transistor Q1 operates relay F connected in series therewith through make contacts ON–1 to the 24-volt battery. The turn-on of transistor Q2 operates the series-connected S relay through break contacts T–8. The operation of relay F closes the following circuit to operate relay F1 on FIG. 4 in the Call State Detector 408: ground on terminal 401, make contacts ON–3, break contacts T–7, make contacts F–3, through the winding of relay F1 to negative 48-volt battery. The operation of this relay indicates that the trunk has received one pulse.

The preceding description assumes the receiver is connected to the trunk prior to the reception of the first pulse. This is not always the case since, in certain instances, one or more pulses may have been received before the connection is established. If the receiver is connected subsequent to the reception of the first pulse but prior to the reception of the second pulse, the circuit operations are similar to those just described, except that ground, rather than a negative 48-volt potential, is on the R1 lead of the receiver immediately upon its connection to the trunk. In this case, transistors Q1 and Q2 are immediately turned on to operate relays F, S, and F1, as an indication that the first digit has been received as described in the preceding paragraphs.

The TL relay in the trunk releases as the second pulse is received. This causes the pulse counter to apply —24 volts to the R1 lead, as already described. The reception of this potential is detected by the R1 Lead Voltage Detector 407, where it is applied to the bases of transistors Q1 and Q2. The appearance of this potential on the base of transistor Q1 turns the transistor off and releases the F relay since the emitter of transistor Q1 is now back-biased with respect to its base. The appearance of this potential on the base of transistor Q2 maintains the base-emitter junction of the transistor forward-biased and, in turn, holds the transistor on and relay S operated. The release of relay F while relay S remains operated closes the following circuit to operate relay S1 within the Call State Detector: ground on terminal 401, make contacts ON–3, break contacts T–7 and F–3, make contacts S–6, through the winding of relay S1 to negative 48-volt battery. The operation of this relay serves as an indication that the trunk is either currently receiving, or has already received, the second pulse.

The preceding description assumes that the receiver is connected to the trunk prior to the reception of the second pulse. This is not always the case since, in certain instances, two pulses may have been received before the connection is established. In such cases, a negative 24-volt potential is applied to the R1 lead of the receiver immediately upon its connection to the trunk. This potential forward-biases transistor Q2 and thereby causes relay S to operate. The operation of relay S in turn, operates relay S1 in the same manner as priorly described. Transistor Q1 remains back-biased and thereby prevents relays F and F1 from operating. The operation of relay S1 signifies that the second pulse has already been received by the trunk circuit.

The control circuitry of the office, including the central processor and its associated circuits, is sufficiently fast in its operation so that an incoming trunk circuit requesting service will normally be connected to a dial pulse receiver prior to the reception of the third pulse by the trunk circuit. This being the case, the aforementioned —24-volt potential applied to the R1 lead of a receiver immediately upon its connection to an incoming trunk signifies that the incoming trunk has already received two—and only two—pulses for the call. The speed at which the control equipment of the office operates enables this two-pulse condition to be uniquely represented by the —24-volt potential even though no further potential changes take place on the R1 lead as subsequent pulses are received by the trunk.

Certain instances may occur in which a delay is encountered by the central processor in connecting a receiver to a bidding trunk. This delay may be of sufficient duration so that there is no assurance that more than two pulses have not already been received by the trunk. The detailed circuit operations associated with this condition are subsequently described elsewhere in this specfication.

The dial pulse regenerator 409 includes the L and the A relays. The L relay is connected via make contacts ON–7 to conductor T1 immediately upon the seizure of the receiver, and it then follows the pulses applied to the T1 conductor by the trunk circuit. The pulsing of the L relay prior to the operation of relay S1 (when two pulses have been received) has no effect upon the receiver. However, immediately upon the operation of relay S1, a circuit is closed within the dial pulse regenerator, causing relay A to operate and release in synchronism with relay L. This circuit includes ground on terminal 410, make contacts L–1 and S1–2, the winding of relay A, make contacts ON–4, to the positive 24-volt battery.

*Pulse counter—FIG. 6*

The operation of relay L, following the operation of relay S1, operates relay A and, in turn, operates relay B within the pulse counter 600 on FIG. 6 over the following circuit: ground on terminal 601, make contacts ON–9, terminals 603 and 602, make contacts A–8, and through the winding of relay B to negative 48-volt battery to operate it. The relay is of the slow-release type and remains operated for the rest of the receiver usage on this call. Relay L releases at the third pulse and, in turn, releases relay A. The release of this relay extends the aforementioned ground on terminal 602 through break contacts A–8, P5–10, P4–7, P3–2, and P2–10, and make contacts B–6, and through the winding of relay C to negative 48-volt battery to operate it. This relay is of the slow-release type and, once operated, it remains operated over the back contacts of the A relay during the pulsing interval for the first digit. The continued operation of relay C for the duration of the pulse reception, together with the pulsing of the A relay at this time, causes relays P1 through P5 in the pulse counter on FIG. 6 to count the number of pulses in the received pulse train in the manner indicated in the following paragraphs.

The release of relay A at the beginning of the third dial pulse closes the following circuit to operate relay P1: ground on terminal 601, make contacts ON–9, terminal 603, break contacts A–6, make contacts C–10, break contacts P2–6, through the winding of relay P1 to negative 48-volt battery to operate it. At the end of the third pulse, which is the first pulse received and counted by the dial pulse receiver, relay A reoperates and operates relay P2 over the following circuit: the aforementioned ground on terminal 603, make contacts A–6 and P1–1 (since relay P1 remains operated), break contacts P2–12, and through the winding of relay P2 to negative 48-volt battery. Immediately upon its operation, relay P2 operates its transfer contacts P2–12, thereby completing a holding path for itself to ground in series with make contacts P1–2, terminal 604, make contacts C–6, to ground on terminals 602 and 603. Counting relays P1 and P2 are thus operated after the reception of this pulse.

Relay A releases upon the reception of the next pulse (the fourth pulse received by the trunk and the second pulse received by the dial pulse receiver). Prior to this, relay P1 was held over the circuit including ground on terminal 603, make contacts A–6, P1–1, and P2–6, to the winding of relay P1. The release of relay A at this time opens its make contacts A–6 to release relay P1. The release of relay A at this time also closes the following circuit to operate relay P3: ground on terminal 602, make contacts C–6, terminal 604, make contacts P2–2, break contacts P1–8, P5-1, and P4–4, to the winding of relay P3 to operate it. This relay, in operating, closes a holding circuit through make contacts P3–11 and P2–11 to ground on terminal 604. The reoperation of relay A at the termination of this pulse releases relay P2 by opening the A–6 break contacts in the following operate circuit: ground on terminal 603, break contacts A–6, make contacts C–10, and the make contacts P2–12.

Counting relays P1, P2, P4, and P5 are released at this time, while relay P3 is operated. This particular combination indicates that two pulses have been received and counted by pulse counter 600.

Relay A releases upon the reception of the next pulse (the fifth pulse received by the incoming trunk and the third pulse received by the dial pulse receiver). The release of this relay, now that relay P2 is released, closes the same circuit as priorly described to operate relay P1. The reoperation of relay A, at the termination of this pulse, operates relay P2 over the same circuit as before. Relays P1, P2, and P3 are now operated. The following circuit is closed to operate relay P4: ground on terminal 604, as already described, make contacts P2–2, P1–8 and P3–3, and break contacts P5–8, to the winding of relay P4. This relay, in operating, closes its make contacts P4–11 to close a holding path for itself through break contacts P5–7 to ground on terminal 604. Relays P1, P2, P3, and P4 are currently operated.

Relay A releases at the beginning of the next pulse (the fourth pulse counted by pulse counter 600 and the sixth pulse received by the incoming trunk circuit). The release of this relay opens its make contacts A–6 to release relay P1. Relays P2, P3, and P4 remain operated at this time. Relay A recloses at the termination of this pulse and, in so doing, opens its break contacts A–6 to release relay P2. Immediately prior to this, relay P2 was held up over the following circuit: ground on terminal 603, break contacts A–6, make contacts C–10, and make contacts P2–12, to the winding of relay P2. Relays P3 and P4 currently remain operated.

Relay A releases upon the reception of the next pulse (the fifth pulse received by pulse counter 600 and the seventh pulse received by the incoming trunk). The release of this relay at this time recloses its break contacts A–6 to operate relay P1 in the same manner as before. Prior to the operation of relay P1 at this time, relay P3 was held over the circuit including ground on terminal 604, break contacts P1–2, and make contacts P3–11, to the winding of relay P3. The operation of relay P1 opens its P1–2 break contacts, thereby opening the holding circuit for relay P3 and causing it to release; with relays P1 and P4 remaining operated. Relay A reoperates at the termination of this pulse and, in so doing, extends the ground from terminal 603 through its make contacts A–6, make contacts P1–1, and break contacts P2–12, to the winding of relay P2, to operate it. Relays P1, P2, and P4 remain operated at this time to signify the termination of this pulse.

Relay A releases at the beginning of the next received pulse (the sixth pulse received by pulse counter 600 and the eighth pulse received by the incoming trunk circuit). The release of the A relay at this time opens its make contacts A–6 and thereby opens the holding circuit for relay P1 to cause its release. Relays P2 and P4 remain operated. Next, relay A recloses at the termination of this pulse and, in so doing, opens its break contacts A–6 to break the holding circuit for relay P–2, thereby causing its release. The release of relay P2 closes the following circuit to operate relay P5 at this time: ground on terminal 604, break contacts P1–P12, P2–P4 and P3–12, make contacts P4–12, through the winding of relay P5 to operate it. Relays P4 and P5 remain operated at this time, as an indication that this pulse has been received and registered.

Next, relay A releases upon reception of the next pulse (the seventh pulse received by the pulse counter 600 and the ninth pulse received by the incoming trunk). The release of relay A reoperates relay P1 in the same manner as before. Next, relay A operates upon the termination of this pulse and, in so doing, closes its make contacts A–6 to operate relay P2 in the same manner as already described. Relays P1, P2, P4, and P5 are operated at this time to manifest the reception of this pulse.

Relay A releases at the beginning of the next pulse (the eighth pulse received by pulse counter 600 and the tenth pulse received by the incoming trunk circuit). The release of relay A releases relay P1 by opening the make contacts A–6 and, at the same time, closes the following circuit to operate relay P3: ground on terminal 604, make contacts P2–2, break contacts P1–8, make contacts P5–1 and P4–4, to the winding of relay P3, to operate it. Relays P2, P3, P4, and P5 are now operated. Next, relay A reoperates at the termination of this pulse and, in so doing, opens its break contacts A–6 to release relay P2. Relays P3, P4, and P5 are now operated to indicate the termination of the reception of this pulse.

The foregoing describes how the pulse counter circuit of FIG. 6 operates to count from one to eight pulses during the reception of the first digit pulse train. As already discussed, the pulse counter in the incoming trunk counts the first two pulses of the first digit; therefore, the pulse counter of FIG. 6 will never count more than eight pulses for the first digit. However, after the first digit is counted, the circuit of FIG. 6 counts all pulses received by the incoming trunk for all subsequent digits received on the call.

Since the preceding description is confined to a description of the manner in which the circuit of FIG. 6 counts up to eight pulses, the following paragraphs will describe the operation of this circuit for the reception of pulse trains having nine and ten pulses therein. The operation of this circuit in counting digital values of one through eight for any digit subsequent to the first is exactly the same as already described.

Recalling that relays P3, P4, and P5 are operated to indicate a count of eight, the reception of the ninth pulse releases relay A, which recloses its break contacts A–6 to operate relay P1. The reoperation of relay A at the termination of the ninth pulse recloses its make contacts A–6 to operate relay P2. Prior to the operation of relay P2, relay P4 is held up over the following circuit: ground on terminal 604, break contacts P2–2, make contacts P4–11, to the winding of P4. The operation of relay P2 at this time opens its break contacts P2–2 in this circuit, thereby releasing relay P4, Relays P1, P2, P3, and P5 are operated at this time to indicate a count of nine.

Relay A next releases upon the reception of the tenth digit and, in so doing, releases its break contacts A–6 to release relay P1. Relay A recloses at the end of the tenth digit and opens its break contacts A–6 to break the holding circuit for relay P2, thereby releasing it. Relays P3 and P5 together remain operated at this time, to indicate a count of ten.

*Interdigital interval following first digit*

Relay C on FIG. 6 is of the slow-release type and remains operated over the break contacts A–8 of the A relay during the reception of a pulse train. The A relay stops pulsing and releases relay C at the end of the first digit pulse train. The release of relay C is an indication that the circuit is in the interdigital interval condition following the first digit. Immediately prior to the release of relay C, relay TM in the call state detector 408 of FIG. 4 is maintained operated from ground on terminal 401 over a circuit including make contacts C–8 of relay C, since relays S1 (FIG. 4) and B (FIG. 6) are currently operated. The release of relay C during the interdigital interval opens the holding circuit for relay TM and causes it to release. The release of relay TM closes the following circuit relay T in the call state detector 408: ground on terminal 401, make contacts ON–3, break contacts TM–8, through the winding of relay T to negative 48-volt battery. The operation of relay T is an indication that the first digit has been received.

The dial pulse receiver counts all pulses representing subsequently received digits and, therefore, the R1 lead voltage detector 407 is no longer needed on this call since the two-pulse counter in the incoming trunk has by now completed its function. Therefore, the operation of relay T opens its break contacts T–3 within the R1 lead voltage detector to isolate this circuit from the R1 lead for the remainder of the call. The operation of relay T also closes its make contacts T-12 in the dial pulse regenerator 409 to provide an auxiliary path for interconnecting relay A with the pulsing make contacts L–1 of the L relay. This circuit is required since relay S1 releases on the first pulse of the second digit as subsequently described.

The P– counting relays are held operated by make contacts A–6 and A–8 upon the release of relay C during the interdigital interval. The subsequent release of relay A upon the reception of the first pulse of the second digit, releases the counting relays. At that time, break contacts P5–10, P4–7, P3–2, and P2–10 ensure that relay C does not operate until the counting relays are released.

The dial pulse receiver transmits, during the interdigital interval, information to the central processor signifying the value of the first digit. The digit information registered in pulse counter 600 is translated by readout circuit 500 and applied to the dial pulse receiver scanner 318 on FIG. 3 to energize certain ferrods therein. The central processor determines the value of the received digit from the energized ferrods. The readout circuit 500 translates the information stored in the counter circuit 600 from a 1-out-of-10-binary form, together with the addition of an odd parity check. The resultant translated output information is then applied to ferrods E, 1, 2, 4, and 8 in the dial pulse receiver scanner on FIG. 3.

*Readout circuit—FIG. 5*

Ferrods ON, RO, and DP in the scanner are not used for the transmission of digital information. The ON scanner is energized whenever the dial pulse receiver is in an off-normal state, i.e., a busy condition. The energization of this ferrod enables the central processor to scan the current state of all dial pulse receivers in order to determine and locate an idle one upon the reception of a call by an incoming trunk. The RO scanner is energized whenever the central processor determines that the trunk should be routed to a reorder tone. This operation is described in detail subsequently.

The DP ferrod in scanner 318 is energized by the readout circuit 500 as an indication that the scanner currently contains digital information that should be read out and stored by the processor.

The following paragraphs describe the manner in which the readout circuit 500 generates output information representing digital values 1 through 10.

The following table indicates the combination of the P– counting relays that are operated together with the ferrods that are energized for the registration of the digits 1 through 10.

| Registered Digit | Counting Relays Operated | Ferrods Energized |
|---|---|---|
| 1 | P1, P2 | 1. |
| 2 | P3 | 2. |
| 3 | P1, P2, P3, P4 | E, 1, 2. |
| 4 | P3, P4 | 4. |
| 5 | P1, P2, P4 | E, 1, 4. |
| 6 | P4, P5 | E, 2, 4. |
| 7 | P1, P2, P4, P5 | 1, 2, 4. |
| 8 | P3, P4, P5 | 8. |
| 9 | P1, P2, P3, P5 | E, 1, 8. |
| 10 | P3, P5 | E, 2, 8. |

The preceding table indicates that the digit 1 is registered in the pulse counter by the operation of relays P1 and P2. At that time, the readout circuit 500 energizes ferrod 1 to read out a binary 1 to scanner 318. The relay S1 is assumed to be released, as will be described later; therefore, the path of FIG. 5 to energize ferrod 1 may be traced as follows: ground on terminal 501, make contacts T–6, break contacts C–7, terminal 502, break contacts P5–6 and P3–10, make contacts P1–1, break contacts P4–8 and S1–12, to conductor 1 extending from FIG. 5 to FIG. 3 to one side of the winding of ferrod 1.

The registration of the digit 2 is manifested by the operation of relay P3 and the energization of ferrod 2. The circuit over which ferrod 2 is energized may be traced as follows: ground on terminal 502, break contacts P5–6, make contacts P3–10, break contacts P4–10 and S1–10, to conductor 2 extending to ferrod 2.

The registration of the digit 3 is indicated by the operation of relays P1, P2, P3, and P4 and the energization of ferrods E, 1, and 2. The E ferrod is energized because of the aforementioned odd parity bit. The paths over which these ferrods are energized at this time may be traced as follows: ground on terminal 502, break contacts P5–6, make contacts P3–10, P4–10, and P1–10, break contacts S1–9, to terminal 505. From there, the ground may further be extended through diode D10 to conductor 1 extending to ferrod 1. The ground on terminal 505 may also be extended through diode D5 to conductor 2 extending to ferrod 2. The ground on terminal 505 may finally be extended through diode 414 to conductor E extending to the E scanner ferrod.

The registration of the digit 4 is represetnted by the operation of relays P3 and P4 and by the energization of scanner ferrod 4. The path over which this ferrod is energized may be traced as follows: ground on terminal 502, break contacts P5–6, make contacts P3–10 and P4–10, break contacts P1–10 and S1–7, to output conductor 4 extending to ferrod 4.

Relays P1, P2, and P4 are operated for the registration of the digit 5 and, at that time, scanner ferrods E, 1, and 4 are energized. The paths over which these ferrods are energized may be traced as follow: ground on terminal 502, break contacts P5–6 and P3–10, make contacts P1–1 and P4–8, break contacts S1–0, to terminal 506. The ground on terminal 506 may then be extended through diode D18 and over conductor E to the E ferrod. The same ground may be further extended through diode D13 to conductor 1 extending to ferrod 1. The same ground may be finally extended through diode D9 extending to conductor 4 and scanner ferrod 4.

The registration of the digit 6 is indicated by the operation of relays P4 and P5 and by the energization of scanner ferrods E, 2, and 4. The paths over which these ferrods are energized may be traced as follows: ground on terminal 502, make contacts P5–6 and P4–6, break contacts P3–6, P1–6, and S1–6 to terminal 507. The ground on this terminal may be first extended through diode D4 and over conductor 4 to scanner ferrod 4. The ground on terminal 507 may be secondly extended through diode D6 to output conductor 2 extending to ferrod 2. The ground on terminal 507 may be thirdly extended through diode D17 to output conductor E and ferrod E.

The registration of the digit 7 is indicated by the operation of relays P1, P2, P4, and P5, and by the energization of scanner ferrods 1, 2, and 4. The paths over which these ferrods are energized may be traced as follows: ground on terminal 502, make contacts P5–6 and P4–6, break contacts P3–6, make contacts P1–6, break contacts S1–4, to terminal 508. The ground on terminal 508 may be first extended through diode D3 to conductor 4 and ferrod 4. The ground on terminal 508 may be secondly extended through diode D11 to conductor 1 extending to ferrod 1. The ground on terminal 508 may be finally extended through diode D7 extending to conductor 2 and ferrod 2.

Relays P3, P4, and P5 together are operated for the registration of the digit 8 and, at that time, scanner ferrod 8 is energized. The path over which this ferrod is energized may be traced as follows: ground on terminal 502, make contacts P5–6, P4–6, and P3–6, break contacts P2–8 and S1–3, to conductor 8 extending to ferrod 8.

A digit 9 is registered by the operation of relays P1, P2, P3, and P5 and, at that time, the readout circuit energizes ferrods E, 1, and 8. The paths over which these ferrods are energized may be traced as follows: ground on terminal 502, make contacts P5–6, break contacts P4–6, make contacts P1–4, to terminal 509. The ground on this terminal may be first extended through diode D15 extending to conductor E and ferrod E. The ground on this terminal may be secondly extended through diode D1 to conductor 8 extending to ferrod 8. The ground on this terminal may be finally extended through diode D12 to output conductor 1 extending to ferrod 1.

A digit 10 is registered by the operation of relays P3 and P5 and the energization of ferrods E, 2, and 8. The path over which these ferrods is energized may be traced as follows: ground on terminal 502, make contacts P5–6, break contacts P4–6 and P1–4, to terminal 510. The ground on this terminal may be first extended over diode D16 to conductor E extending to ferrod E. The ground on this terminal may be secondly extended through diode D2 to conductor 8 extending to ferrod 8. The ground on this terminal may be finally extended through diode D8 to output conductor 2 extending to ferrod 2.

Contacts of the S1 relay on FIG. 4 are wired to readout circuit 500 in such a manner that the output of the readout circuit either equals or exceeds by 2 the digit registered in the pulse counter of FIG. 6, depending upon whether relay S1 is released or operated. Specifically, the unoperated condition of relay S1 enables circuits to be completed through its break contacts so that the digit read out by the circuit of FIG. 5 to scanner 318 equals the digit stored in the circuit of FIG. 6. On the other hand, the operated condition of relay S1 closes circuits on FIG. 5 so that the digit read out to the scanner exceeds by 2 the magnitude of the digits stored in the counter circuit of FIG. 6. Relay S1 is operated during the readout for the first digit in order to compensate for the fact that the first two pulses of this digit are registered in the trunk counter. This relay releases following the readout of the first digit and, from then on, the digit information transmitted to scanner 318 corresponds to that registered in the pulse counter of FIG. 6.

In the tracing of the foregoing circuit paths on FIG. 5, it was assumed that relay S1 was released. This assumption was made in order to facilitate an initial understanding of the operation of the circuit. The following paragraphs describe the manner in which the readout circuit increases by 2 the magnitude of the registered digit whenever relay S1 is operated.

It will be recalled, from the foregoing description, that when relay S1 is released and relays P1 and P2 are operated to register the digit 1, the ferrod 1 in the scanner is energized over the following circuit: ground on terminal 502, break contacts P5–P6 and P3–10, make contacts P1–1, break contacts P4–8 and S1–12, to output conductor 1 extending to ferrod 1. The registration of a 1 at the time relay S1 is operated, the received digit being a 3 as priorly described causes the readout circuit to increase by 2 the value of the registered digit and, therefore, causes ferrods E, 1, and 2 to be energized over the following circuit: ground on terminal 502, break contacts P5–6 and P3–10, make contacts P1–1, break contacts P4–8, to terminal 511. From there, the path is not extended to output conductor 1, as was the case when relay S1 was released, but instead, the path is now extended through make contacts S1–12 to terminal 505, from which the path may then be extended through diodes D10, D14, and D5, respectively, to output conductors 1, E, and 2, respectively, and, in turn, to scanner ferrods 1, E, and 2, respectively. The combined energization of these three ferrods transmits a binary 3 to the central processor in the same manner as for the case priorly described, when the digit 3 was registered in the pulse counter of FIG. 6 at the time relay S1 was not operated. Similar circuit paths may be traced for the registration of digits 1 through 8 in the pulse counter at the time relay S1 is operated, in order to cause the readout to be increased by a count of 2.

Summarizing the foregoing, relay S1 remains operated during the interdigital interval following the first digit in order that the readout circuit of FIG. 500 can read out to the scanner the true value of the first digit by increasing the digit registered in the pulse counter 600 by a count of 2. Relay S1 then releases as the first pulse of the second digit is received and, from then on, the readout circuit 500 transmits to the scanner the true value of the digit stored in pulse counter 600.

It was priorly described how relay T operated after the reception of the first digit upon the release of relay TM. Relay T, in operating, closed a holding path for itself over its make contacts T–2 and make contacts B–4 to the terminal 401 ground. It was further described how relay T, in operating, opened its break contacts T–3 to separate the R1 lead voltage detector 407 from the R1 lead. This, in turn, caused relay S and relay F to release. Relay S1 at that time remained operated over the circuit comprising make contacts S1–5, T–4, and A–8, to ground. Relay A releases upon the reception of the first pulse for the second digit and opens its make contacts A–8 to release relay S1. From then on, the readout circuit reads out the true value of the digit registered in pulse counter 600. Relay A remains connected to the pulsing make contacts L–1, via make contacts T–12 of relay T operated. This enables relay A to follow all pulses for the second and any subsequent digits.

If the first digit is a 1, the digit is stored in the pulse counter of the trunk and no pulses are received by the dial pulse receiver. In this case, the only indication to the dial pulse receiver is a ground on the R1 lead which turns on transistors Q1 and Q2 and operates relays F and S in the manner before described. The operation of relay F, in turn, operates relay F1, the operation of which opens the circuit for relay TM to cause it to begin releasing. No further pulses are received, relay TM releases at the end of the interdigital interval and, in turn, operates relay T as an indication that the first digit has been counted. Relay S1 did not operate, and its released condition at this time indicates that only a 1 has been received. The following circuit is now closed in the readout circuit of FIG. 500 to energize ferrod 1 as an output indication of 1 to the scanner: ground on terminal 502, break contacts P5–6, P3–10, P2–7, S1–11 and S1–12, to output conductor 1 and ferrod 1.

The operation of relay T, as before described, connects the pulsing contacts L–1 of relay L to the A relay so that it may count all pulses of all subsequent digits in the normal manner.

If a 2 is received for the first digit, no pulses are received by the dial pulse register since both pulses received are stored by the pulse counter of the trunk. The dial pulse receiver receives a —24-volt battery on its R1 lead, which turns on transistor Q2 to operate relay S. The operation of relay S closes the circuit already described to operate relay S1. The operation of relay S1 closes the following circuit to operate relay A: ground on terminal 410, make contacts L–1 and S1–2, to the winding of relay A, to operate it, since the other side of its winding is connected to battery through make contacts ON–4. The operation of relay A operates relay B, which, together with relay S1 operated, opens a circuit for relay TM in the call state detector, thereby causing it to release at the end of the interdigital interval. The release of relay TM operates relay T. The operated condition of relay S1 at the time relay TM releases and relay T operates closes the following circuit to cause readout circuit 500 to apply a binary 2 to the scanner: ground on terminal 502, break contacts P5–6, P3–10 and P2–7, make contacts S1–11, to output conductor 2 extending to ferrod 2. Subsequently, when the first pulse of the second digit is received, relay A releases and, in turn, releases relay S1, following which relay A, in combniation with the pulse counter 600, counts all subsequent pulses of the second and all subsequent digits in the manner already described.

It has already been mentioned that, during the first interdigital interval, when relay T is up and relay C is down, the DP ferrod in scanner 318 is energized. This is an indication to the central processor that there is a digit registered in this receiver. The central processor, upon determining this, scans the ferrods in order to identify the registered digit. With relay ON or DEL operated as a busy indication to the processor, the ON ferrod is energized through either make contacts ON–1 or DEL–1, respectively, to ground on terminal 503 make contact B–8 also holds the ON ferrod energized since relay B, being slow to release, may not release before the ON relay does. Since make contact B–8 will hold the ON ferrod operated, even if the ON relay releases, the central processor is prevented from seizing this circuit prior to the release of relay B.

*Delayed seizure*

The following paragraphs describe the circuit operation in the event that the central processor encounters a delay in obtaining a dial pulse receiver. When the processor determines that the attachment of a dial pulse receiver to a calling trunk is required, it scans its list of receivers stored in its memory. If it finds none available, it also stores in its memory an indication stating that a delay has been encountered. Susequently, when it rescans its list of receivers and finally finds an idle one, it commands the signal distributor to operate the DEL relay within the seizure control circuit 400, rather than the ON relay. The operation of the DEL relay informs the dial pulse receiver that a delay has been encountered in its attachment to the calling trunk. This delay is somewhat critical, in that a different circuit within the receiver may have to be taken in accordance with the length of the delay. When the DEL relay is operated, the receiver looks at the R1 lead to determine how many pulses have been counted by the trunk at the time of its attachment thereto. If no pulses have been counted, as indicated by a —48-volt battery on the R1 lead, the circuit can proceed to count all pulses in the normal manner. If a ground is on the R1 lead, as an indication that one pulse has been received, the circuit can also proceed to count the remaining pulses in the normal manner. However, if a —24-volt potential is on the R1 lead, thereby indicating that two pulses have been received, special action must be taken and the call cannot be handled in the normal manner. In this case, due to the limitations of the dial pulse counter in the trunk, the presence of a —24-volt potential on the R1 lead does not precisely indicate whether the second pulse is currently being received, it has just been received, or has long since been received, since the counter maintains the —24-volt potential on the R1 lead for the remainder of the call immediately upon the reception of the second pulse. In other words, this potential is impressed on the R1 lead, not only immediately upon the reception of the second pulse, but is also on the lead after addition pulses beyond the second have been received.

Thus, once the dial pulse receiver is seized by the operation of its DEL relay, it is vital that it immediately determine whether less than two pulses have already been counted by the trunk. This is done by connecting the R1 lead through make contacts DEL–5 to the R1 lead voltage detector 407, as before. If no pulses have been received, or if only one pulse has been received, as indicated by the presence of either negative 48-volts or ground, respectively, on the R1 lead, the receiver will operate in the normal manner. However, if more than one pulse has been received, as indicated by the application of —24-volts on the R1 lead, relay F will not operate and relay S will operate. The operation of relay S operates relay S1 to signify a count of two. The failure of relay F to operate prevents relay F1 from operating. At this time, with relays DEL and S operated and with relay F1 released, the R0 relay in the seizure control circuit operates and causes the readout circuit 500 to energize the R0 ferrod through make contacts R0–6 to ground on terminal 504. The central processor recognizes the energization of this ferrod as an indication that too great a delay has occurred in attaching the receiver for the call to be handled in the normal manner. The processor then takes the necessary circuit actions to connect the trunk to a source of reorder tone, thereby informing the calling party that the call should be redialed.

*Completion of call*

Returning to the assumption that reorder tone is not required and that the call is handled in the normal manner, the central processor receives from scanner 318 the digits outpulsed from the originating office and registered in the dial pulse receiver as described. Once the processor receives this information, it causes link 314 to disconnect the trunk and the receiver. It also releases relay ON in the seizure control circuit 400, thereby restoring this dial pulse receiver to an idler condition. The network controller 205 next controls the operation of switching network 204 and outgoing circuitry 227, to establish a connection extending from the calling incoming trunk circuit to the succeeding office. The central processor at this time also instructs signal receiver 304 and signal distributor 310 to release trunk relay TB and to operate trunk relays TA and TC. Relay TB released, together with relays TA and TC operated, places the trunk in a cut through condition whereby the calling party may converse with the called party after the required connection is established in the terminating office. Supervision of the connection is then maintained by the current flowing through the terminating circuitry of the incoming trunk. This circuitry includes both windings of inductance 219 and the ferrod 320 within the trunk scanner 319. This ferrod is scanned repeatedly by the central processor, under control of the signal receiver, and the connection within the toll office is maintained as long as the central processor detects outgoing loop current in ferrod 320. The central processor breaks the connection upon the termination of this current.

It is to be understood that the above-described arrangements are but illustrative of the application of the principles of the invention. Numerous other arrangements may be devised by those skilled in the art without departing from the spirit and scope of the invention.

What is claimed is:

1. In a switching system, an incoming trunk, a counter in said trunk for counting $n$ pulses of the first digit received by said trunk on a call wherein $n$ may vary from call, to call but is always less than or equal to the number of pulses comprising said first digit, and a dial pulse receiver for counting any additional pulses in excess of $n$ comprising said first digit.

2. The combination recited in claim 1 together with a readout circuit in said receiver for providing an output signifying the total number of pulses comprising said first digit.

3. The combination recited in claim 1 together with means in said receiver for counting all pulses comprising all subsequently received digits on the same call.

4. The combination recited in claim 3 together with a readout circuit in said receiver for providing output information signifying the number of pulses comprising each received digit.

5. The combination recited in claim 3 together with a readout circuit in said receiver for providing an output indication of $n$ plus the number of pulses counted by said receiver for said first digit and for providing an output indication of the number of pulses counted by said receiver for each digit following the first.

6. In a switching system, a dial pulse incoming trunk, a counter in said trunk for counting $n$ pulses of the first digit received by said trunk on a call, wherein $n$ may vary from call to call but is always less than or equal to the number of pulses comprising said first digit, a dial pulse receiver, means in said trunk for applying all subsequently received pulses in excess of $n$ of said first digit to said receiver, and means in said receiver for counting only the pulses in excess of $n$.

7. In a switching system, a dial pulse incoming trunk, a counter in said trunk for counting $n$ pulses of the first digit received by said trunk on a call, wherein $n$ may vary from call to call but is always less than or equal to the number of pulses comprising said first digit, a dial pulse receiver, means for connecting said receiver to said trunk upon the reception of a call by said trunk, means in said trunk for applying to said receiver all pulses received for said first digit subsequent to said connection, and means in said receiver for counting only the pulses in excess of $n$ that comprise said digit.

8. The invention recited in claim 7 in combination with means in said receiver for counting all pulses of any subsequently received digits, and a readout circuit in said receiver for signifying the number of pulses comprising each digit.

9. In a switching system, a dial pulse incoming trunk, a counter in said trunk for counting $n$ pulses of the first digit received by said trunk on a call, wherein $n$ may vary from call to call but is always less than or equal to the number of pulses comprising said first digit, a dial pulse receiver, means in said trunk for signaling the reception of $n$ pulses of said digit, and means in said receiver responsive to said signal for counting any additional pulses in excess of $n$ received for said first digit.

10. In a switching system, a dial pulse incoming trunk, a dial pulse receiver, a link operable upon the receipt of a call by said trunk for interconnecting said trunk and said receiver, a counter in said trunk for counting $n$ pulses of the first digit received on a call, wherein $n$ may vary from call to call but is always less than or equal to the number of pulses comprising said first digit, means in said trunk effective after the establishment of said connection for applying all subsequently received pulses in excess of $n$ to said receiver, means in said trunk for applying a signal to said receiver indicating that $n$ pulses of said first digit have been received, and means in said receiver effective upon the receipt of said indication for counting any subsequently received pulses in excess of $n$ comprising said first digit.

11. The combination recited in claim 10 together with a readout circuit in said receiver for providing an output signifying the total number of pulses comprising said digit.

12. In a switching system, an incoming trunk, a dial pulse receiver, means in said trunk effective upon the receipt of a call by said trunk for requesting a connection between said trunk and said receiver, means operable upon the receipt of said request for interconnecting said trunk and said receiver, means in said trunk for counting up to two pulses of the first digit received by said trunk on a call, means in said trunk effective after the establishment of said connection for applying all subsequently received pulses to said receiver, means in said trunk for signaling said receiver that two pulses have been received by said trunk, and means in said receiver effective upon the receipt of said signal for counting all subsequently received pulses.

13. In a switching system, a dial pulse incoming trunk, a dial pulse receiver, a link operable upon the receipt of a call by said trunk for interconecting said trunk and said receiver, a counter in said trunk for counting up to two pulses of the first digit received by said trunk on a call, means in said trunk effective after the establishment of said connection to said receiver for applying all subsequently received pulses to said receiver, means in said trunk for indicating to said receiver the number of pulses received by said trunk at the time of its connection to said receiver, means in said receiver for determining when two pulses have been counted by said trunk, and means in said receiver effective upon said determination for counting any subsequently received pulses comprising said digit.

14. The combination recited in claim 13 together with means in said receiver for counting all pulses of any subsequently received digit, and a readout circuit in said receiver for providing an output signifying the total number of pulses comprising each digit.

15. In a switching system, a dial pulse incoming trunk, a dial pulse receiver, a link operable upon the receipt of a call by said trunk for interconnecting said trunk and said receiver, a counter in said trunk for counting $n$ pulses of the first digit received by said trunk on a call, wherein $n$ may vary from call to call but is always less than or equal to the number of pulses comprising said first digit, means in said trunk effective after the establishment of said connection to said receiver for applying any subsequently received pulses in excess of $n$ to said receiver, means in said trunk for applying a signal to said receiver indicating that $n$ pulses have been counted by said trunk, and a readout circuit in said receiver for providing an output signifying the number of pulses counted by said trunk for said first digit.

16. In a switching system, an incoming dial pulse trunk, a dial pulse receiver, means effective upon the receipt of a call by said trunk for interconnecting said trunk and said receiver, said connection including a first and a second conductor, means in said trunk for counting the first two pulses received for the first digit on said call, means in said trunk for applying a first potential to said first conductor prior to the reception of any pulses, means in said trunk for applying a second potential to said first conductor following the reception of the first pulse, means in said trunk for applying a third potential to said first conductor upon the reception of said second pulse, means in said trunk for reapplying all received pulses to said second conductor, and means in said receiver effective upon the application of said third potential to said first conductor for counting all subsequent pulses received over said second conductor for said first digit.

17. The invention recited in claim 16 in combination with means in said receiver for providing an output indication of two plus the number of pulses counted by said receiver for the first digit.

18. The invention recited in claim 17 in combination with means in said receiver for counting all pulses of any subsequently received digits, and means for providing an output indication of the number of pulses counted by said receiver for any subsequently received digit.

19. The invention recited in claim 17 in combination with means in said receiver effective on calls for which the first digit is a 1 or a 2 for deriving an output indication of the magnitude of said first digit in response to the final potential applied to said first conductor.

20. The invention recited in claim 16 wherein the first potential is −48 volts, the second potential is ground, and the third potential is −24 volts.

21. In a switching system, an incoming dial pulse trunk, a dial pulse receiver, means effective upon the receipt of a call by said trunk for interconnecting said trunk and said receiver, said connection including a first and a second conductor, means in said trunk for counting the first two pulses received for the first digit on said call, means in said trunk for applying a first potential to said first conductor prior to the reception of any pulses, a second potential to said first conductor following the reception of the first pulse, and a third potential to said first conductor upon the reception of said second pulse, means in said trunk for reapplying all received pulses to said second conductor, a first relay in said receiver for following all pulses applied to said second conductor, a second relay in said receiver, means in said receiver effective upon the application of said third potential to said first conductor for operating and releasing said second relay in synchronism with said first relay, and means operable under control of said second relay for counting all subsequently received pulses comprising said first digit.

22. The invention recited in claim 21 wherein said third potential is maintained on said first conductor for the remainder of the trunk usage on the call, and means in said receiver for counting all pulses of any digits subsequently received on said call.

23. In a switching system, an incoming trunk, means in said trunk for counting up to two pulses of the first digit received on a call, a dial pulse receiver, means for interconnecting said receiver and said trunk upon the reception of a call by said trunk, a normal seizure circuit and a delay seizure circuit in said receiver, means for operating said normal seizure circuit if said connection was completed in less than a predetermined period of time, means for operating said delay seizure circuit if said connection was not completed within said predetermined period of time, means in said receiver for counting pulses received in excess of two for said first digit if said connection was established prior to the reception of the second pulse by said trunk, means in said receiver effective upon the operation of said normal seizure circuit for counting all subsequently received pulses whenever two pulses are received by said trunk prior to the establishment of said connection, and means in said receiver effective upon the operation of said delay seizure circuit for signifying that the call cannot be served whenever two pulses are received by said trunk prior to the establishment of said connection.

24. In a switching system, an incoming trunk, means in said trunk for counting up to $n$ pulses of the first digit received on a call, a dial pulse receiver, means for connecting said receiver and said trunk upon the reception of a call by said trunk, a normal and a delay seizure circuit in said receiver, means for operating either said normal or said delay seizure circuit depending upon whether or not said connection was established within a predetermined period of time, means in said receiver effective upon the operation of said normal seizure circuit for counting any pulses received by said trunk subsequent to the $n$th pulse, means in said receiver effective upon the operation of said delay seizure circuit for counting all received pulses in excess of $n$ for said first digit if said connection was established prior to the reception of $n$ pulses, and means in said receiver effective upon the operation of said delay seizure circuit for signifying that the call cannot be served whenever $n$ pulses are received by said trunk prior to said connection.

25. In a switching system, an incoming trunk, means in said trunk for counting up to $n$ pulses of the first digit received on a call, a dial pulse receiver, means for connecting said receiver and said trunk upon the reception of a call by said trunk, a delay seizure circuit in said receiver, means for operating said delay seizure circuit if said connection is not completed within a predetermined period of time, means in said receiver for counting any pulses received for said first digit in excess of $n$ if said connection was established prior to the reception of the $n$th pulse, means in said receiver effective upon said connection whenever said delay seizure circuit is not operated for counting any subsequently received pulses in the event that $n$ pulses are received prior to said connection, and means in said receiver effective upon the operation of said delay seizure circuit for signifying that the call cannot be served in the event $n$ pulses are received by said trunk prior to said connection.

26. In a switching system, an incoming dial pulse trunk, a dial pulse receiver, a delay seizure circuit in said receiver, means effective upon the receipt of a call by said trunk for interconnecting said trunk and said receiver, means for operating said delay seizure circuit if a delay is encountered in completing said interconnection, means in said receiver effective upon the operation of said delay seizure circuit for counting the pulses received for said first digit subsequent to said connection only in the event that less than $n$ pulses were priorly received by said trunk, and means in said receiver effective upon the operation of said delay seizure circuit for signifying that the call cannot be served in the event the trunk received at least $n$ pulses prior to its connection to said receiver.

27. In a switching system, an incoming trunk, means in said trunk for counting up to two pulses of the first digit received on a call, a dial pulse receiver, means for interconnecting said receiver and said trunk upon the reception of a call by said trunk, a normal and a delay seizure circuit in said receiver, means for operating said normal seizure circuit if said connection is completed in less than a predetermined period of time, means for operating said delay seizure circuit if said connection is not completed within said predetermined period of time, said connection between said trunk and said receiver including a first and a second conductor, means in said trunk for applying to said first conductor a first potential prior to the reception of any pulses, a second potential to said conductor following the reception of a first pulse, and a third potential upon the reception of a second pulse, means in said trunk for reapplying all received pulses to said second conductor, means in said receiver for counting all pulses in excess of two applied to said second conductor for said first digit if said connection was established prior to the application of said third potential to said first conductor, means in said receiver effective upon the operation of said normal seizure circuit for counting all pulses applied to said second conductor subsequent to the establishment of said connection whenever said third potential appears on said first conductor at the time of said establishment, and means in said receiver effective upon the operation of said delay seizure circuit for signifying that the call cannot be served whenever said third potential is applied to said first conductor at the time of said establishment.

28. In a switching system, a dial pulse incoming trunk, a dial pulse receiver, a link operable upon the receipt of a call by said trunk for interconnecting said trunk and said receiver, a counter in said trunk for counting $n$ pulses of the first digit received on a call wherein $n$ may vary from call to call but is always less than or equal to the number of pulses comprising said first digit means in said trunk effective upon the establishment of said connection for applying any subsequently received pulses in excess if $n$ to said receiver, means in said receiver for counting any pulses in excess of $n$ received by said trunk for said first digit, means in said trunk for applying a signal to said receiver indicating the number of pulses counted by said trunk for said first digit when the pulse train representing said digit contains less than $n+1$ pulses, and a readout circuit in said receiver for providing an output signifying the number of pulses comprising said first digit.

29. In a switching system, a dial pulse incoming trunk, a dial pulse receiver, a link operable upon the receipt of a call by said trunk for interconnecting said trunk and said receiver, a counter in said trunk for counting $n$ pulses of the first digit received on a call wherein $n$ may vary from call to call but is always less than or equal to the number of pulses comprising said first digit, means in said trunk for applying a signal to said receiver indicating the number of pulses counted by said trunk for said first digit when the pulse train representing said digit contains less than $n+1$ pulses, and a readout circuit in said receiver for providing an output signifying the number of pulses comprising said first digit.

30. The invention recited in claim 29 in combination with means in said receiver for counting all pulses for any subsequently received digits for said call, said readout circuit being effective to provide an output signifying the number of pulses comprising said subsequent digits.

References Cited

UNITED STATES PATENTS

| | | | |
|---|---|---|---|
| 2,629,016 | 2/1953 | Gooderham | 179—7.1 |
| 2,941,042 | 6/1960 | Joel | 179—18.211 |
| 3,004,108 | 10/1961 | Joel. | |
| 2,926,218 | 2/1960 | Cain | 179—18 |
| 3,151,220 | 9/1964 | Arnold et al. | 179—18 |
| 3,159,716 | 12/1964 | Riddell et al. | 179—18 |

WILLIAM C. COOPER, *Primary Examiner.*

KATHLEEN H. CLAFFY, *Examiner.*

L. A. WRIGHT, *Assistant Examiner.*